No. 706,703. Patented Aug. 12, 1902.
T. R. TIERCE.
BUR CHUCK.
(Application filed Jan. 17, 1902.)
(No Model.)
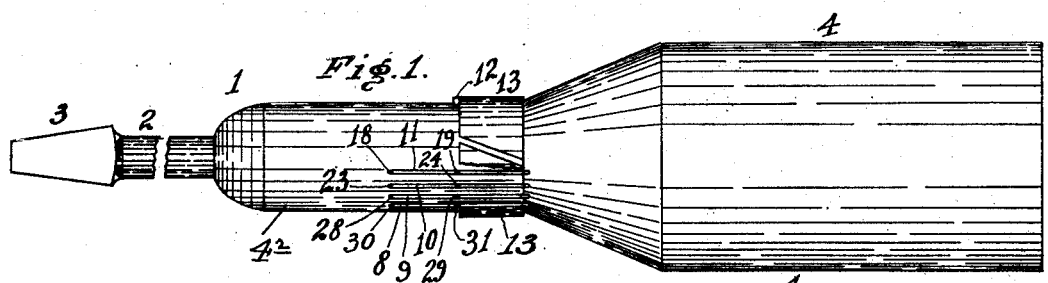
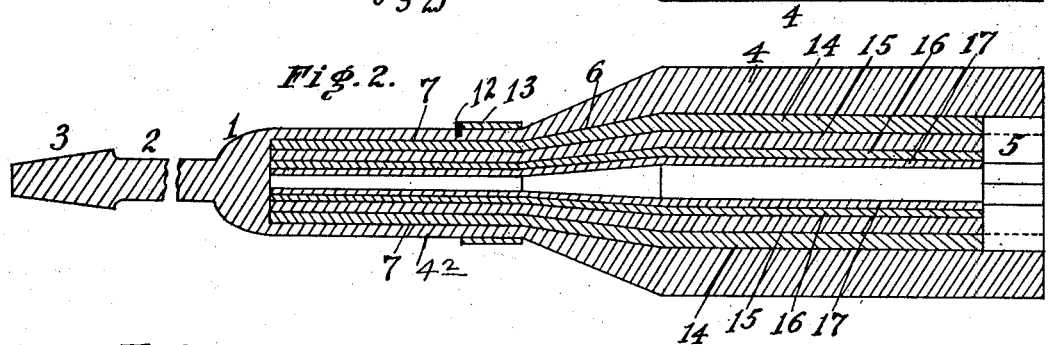
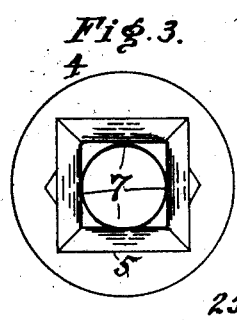
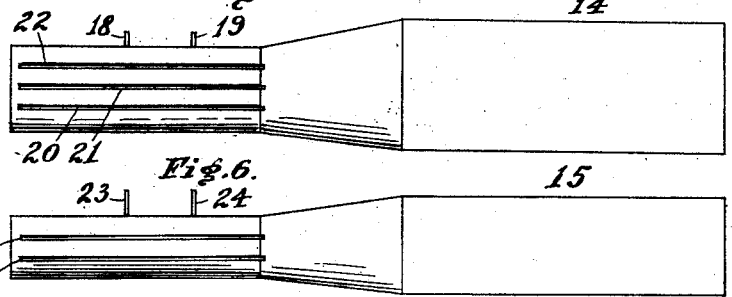
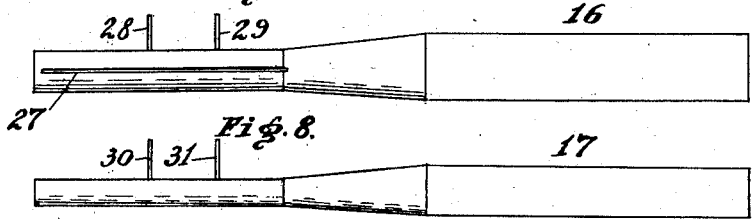
WITNESSES
INVENTOR
Tucker R. Tierce
BY James R. Rogers
ATTORNEY
THE NORRIS PETERS CO., PHOTO-LITHO., WASHINGTON, D. C.

UNITED STATES PATENT OFFICE.

TUCKER R. TIERCE, OF DOWNEY, CALIFORNIA.

BUR-CHUCK.

SPECIFICATION forming part of Letters Patent No. 706,703, dated August 12, 1902.

Application filed January 17, 1902. Serial No. 90,217. (No model.)

*To all whom it may concern:*

Be it known that I, TUCKER R. TIERCE, a citizen of the United States, residing at Downey, in the county of Los Angeles and State of California, have invented a new and useful Bur-Chuck, of which the following is a specification.

This invention relates to devices for rotating burs or nuts or the heads of bolts and like articles; and some of the objects of the invention are to provide a device of this character which will be simple and cheap in construction and at the same time suitable for the purpose intended.

Another object of this invention is to provide such a device capable of use with burs or nuts or like articles of different sizes without changing the device from the brace or other article used in turning the same.

A further object of the invention is to provide simple and ready means for varying the size of the device.

With these and other objects in view the invention consists, essentially, in the construction, combination, and arrangement of parts, substantially as more fully described in the following specification and illustrated in the accompanying drawings, forming part of this application, in which—

Figure 1 is a side elevational view, partly broken away, of a bur-chuck embodying the invention. Fig. 2 is a longitudinal central section of the same. Fig. 3 is an end view of the construction shown in Fig. 1 with the bushings removed. Fig. 4 is a detail view of the split ring; and Figs. 5, 6, 7, and 8 are side elevational views of the bushings, respectively.

Similar characters of reference designate corresponding parts throughout the several views.

Referring to the drawings, and particularly to Figs. 1 and 2 thereof, the reference character 1 designates a bur chuck or bit having a shank or extension 2, terminating in a squared and tapering end 3, adapted to receive the clamping-jaws or portion of a brace or other turning device in the usual manner, and the chuck is preferably provided with an enlarged portion 4, having a bore 5, desirably square in cross-section, and a reduced portion $4^2$, which is circular in cross-section, substantially as shown in Fig. 3 of the drawings.

The bore 5 is preferably reduced, as at 6, Fig. 2, and terminates in the circular bore 7, Fig. 3, from which preferably open longitudinal slots 8, 9, 10, and 11, Fig. 1, and the small portion of the chuck may be provided with one or more lugs or shoulders 12 to retain the engaging ring 13 in position thereon, substantially as illustrated in Fig. 1 of the drawings.

As far as described the chuck 1 is only capable of turning a bur or other device of a certain size, it being understood that the bur will be introduced within the bore 5 and would be engaged by the walls thereof during a process of turning the same; but it is desirable to so construct the chuck that the same can be used to turn burs or nuts of various sizes. To accomplish this end, there is preferably provided a plurality of bushings 14, 15, 16, and 17, whereof the bushing 14 is preferably provided with two lugs or shoulders 18 and 19, constructed to enter the slot 11 in the chuck and pass between the separated ends of the split ring 13 substantially into the position shown in Fig. 1 of the drawings, and the small end of said bushing is preferably provided with three longitudinal slots 20, 21, and 22 for the purpose hereinafter described, it being understood that the bushing 14 is hollow, as are also the other bushings, essentially as shown in Fig. 2.

The hollow bushing 15 is preferably provided with pins or shoulders 23 and 24, constructed to pass through the slot 22 in the bushing 14 and into the slot 10 in the chuck, Fig. 1, and the bushing 15 is preferably provided with slots 25 and 26, Fig. 6 of the drawings.

The bushing 16 is desirably provided with a longitudinal slot 27 and with pins or shoulders 28 and 29 to enter the slot 26 in the bushing 15, the slot 21 in the bushing 14, and the slot 9 in the chuck 1, and finally the bushing 17 may be provided with pins or shoulders 30 and 31 to enter the slot 27 in the bushing 16, the slot 26 in the bushing 15, the slot 20 in the bushing 14, and the slot 8 in the chuck 1, all substantially as shown in Fig. 1.

It will be understood that the chuck may be of any desired size and of any preferred formation or contour externally and that the bushings may be of any number and size or thickness and of suitable contour or formation to enter first the bore of the chuck and then the bore of each other, respectively, in the manner shown, the split ring 13 being moved into such position as to permit the passage therethrough of the pins, lugs, or shoulders upon their respective bushings and then to be turned to prevent the accidental disengagement of the bushings.

The operation of the invention will be readily understood from the foregoing description when taken in connection with the accompanying drawings and the following explanation thereof. Assuming the bushings to be separated from the chuck and the split retaing-ring 13 to be in position thereon, then to introduce the bushings into position within the chuck it is only necessary to force the bushing 14 into the bore 5 of the chuck, so that the pins or shoulders 18 and 19 will enter the slot 11 in the chuck, and to turn the split ring 13 so that the ends thereof will lie on opposite sides of the slot 11, whereupon the pins 18 and 19 may be passed through the slot and beyond the ring into the position shown in Fig. 1, where they will be retained by turning the ring slightly. The bushing 15 may be introduced within the bushing 14, so that the pins 23 and 24 of the former will enter the slot 22 in the latter and will also enter the slot 10 in the chuck after passing through the ring 13, as before described. Then the bushing 16 will be forced into the bushing 15 in such a manner that the pins 28 and 29 of the first-mentioned bushing will enter the slot 25 of the bushing 15 and also the slot 21 of the bushing 14 and finally the slot 9 of the chuck. Finally the bushing 17 will be introduced within the bushing 16, so that the pins 30 and 31 of the bushing 17 will enter the slot 27 of the bushing 16, as well as the slot 26 of the bushing 15 and the slot 20 of the bushing 14, and lastly slot 8 in the chuck 1, the split ring 13 having been turned in a suitable position to permit the entrance of said pins or shoulders, as at first described. The respective bushings being now assembled in their operative positions within the chuck-bore, it is only necessary to describe the manner of reducing the bore 5 of the chuck in order that the same may fit any size bur or nut. This is accomplished by turning the split ring 13 until the opening therein registers with the slot 11, whereupon the pin 19 is passed toward the large part of the chuck until the ring 13 occupies a position between the pins 18 and 19, when the ring may be turned away from the slot 11 to retain the bushing 14, extended into the position indicated by dotted lines in Fig. 2 of the drawings. If the bushing 14 is still too large to turn the bur, then the bushing 15 can be lowered or extended into the position occupied by the bushing 14 by passing the pin 24 along the slot and between the ends of the split ring in the manner just described, and should it be desired to turn a still smaller bur or nut then the bushings 16 and 17 can be likewise extended until the ring 13 lies between the pins upon all of the bushings and retains the latter in operative position, as will be readily understood.

It is not desired to limit this invention to the specific construction, combination, and arrangement of parts herein shown and described, and the right is reserved to change the same in practice.

What I claim as my invention, and desire to secure by Letters Patent, is—

1. A bur-chuck provided with means for varying the size thereof to accommodate different-size nuts or burs and means for retaining the first-mentioned means in operative position after the extension thereof.

2. A bur-chuck provided with a plurality of bushings and means for retaining bushings singly or collectively in an extended and retracted position.

3. A bur-chuck provided with a plurality of bushings and a ring for retaining said bushings singly or collectively in both an extended and retracted position.

4. A bur-chuck provided with a plurality of bushings constructed to fit one within the other and all within the chuck and a device for retaining the bushings in an extended or retracted position.

5. A device of the character described provided with a hollow interior, bushings constructed to fit within the device within each other and a ring for retaining the bushings in both an extended and retracted position.

6. A device of the character described provided with a hollow interior and having slots, bushings or sleeves constructed to fit within said device and within each other and having slots and pins to enter said slots in the device and the bushings and a split ring upon the device constructed to engage said pins, to retain the bushings in an extended and retracted position.

In testimony whereof I have signed my name to this specification in the presence of two subscribing witnesses.

TUCKER R. TIERCE.

Witnesses:
J. W. KEMP,
L. B. ALDERETE.